United States Patent
Chen et al.

(10) Patent No.: US 12,434,170 B2
(45) Date of Patent: Oct. 7, 2025

(54) METHOD FOR PREPARING BIOACTIVE PARTICLES BY SPRAY DRYING, LIQUID NITROGEN QUICK-FREEZING AND VACUUM FREEZE DRYING

(71) Applicant: NANTONG DONG-CONCEPT NEW MATERIAL TECHNOLOGY LTD., Nantong (CN)

(72) Inventors: Xiaodong Chen, Nantong (CN); Wenjie Lu, Nantong (CN); Zhenkai Liao, Nantong (CN)

(73) Assignee: NANTONG DONG-CONCEPT NEW MATERIAL TECHNOLOGY LTD., Nantong (CN)

( * ) Notice: Subject to any disclaimer, the term of this patent is extended or adjusted under 35 U.S.C. 154(b) by 0 days.

(21) Appl. No.: 18/280,244

(22) PCT Filed: Jan. 20, 2022

(86) PCT No.: PCT/CN2022/072985
§ 371 (c)(1),
(2) Date: Sep. 4, 2023

(87) PCT Pub. No.: WO2023/103153
PCT Pub. Date: Jun. 15, 2023

(65) Prior Publication Data
US 2024/0139647 A1    May 2, 2024

(30) Foreign Application Priority Data
Dec. 8, 2021    (CN) .......................... 202111512342.8

(51) Int. Cl.
*B01D 1/18*    (2006.01)
*B01J 2/04*    (2006.01)
*F26B 3/12*    (2006.01)

(52) U.S. Cl.
CPC .................. *B01D 1/18* (2013.01); *B01J 2/04* (2013.01); *F26B 3/12* (2013.01)

(58) Field of Classification Search
CPC ................. B01D 1/18; B01J 2/04; F26B 3/12
See application file for complete search history.

(56) References Cited

U.S. PATENT DOCUMENTS 3,842,888 A * 10/1974 Gibbons ................ C11D 3/046
                                                    252/378 R
5,900,384 A *  5/1999 Soltani-Ahmadi ..........................
                                                    B01J 37/0236
                                                    502/200

(Continued)

FOREIGN PATENT DOCUMENTS

CN    101713607 A    5/2010
CN    107109342 A    8/2017

(Continued)

*Primary Examiner* — Jonathan Miller
(74) *Attorney, Agent, or Firm* — Bayramoglu Law Offices LLC

(57) ABSTRACT

A method for preparing bio-active particles by spray drying, liquid nitrogen quick-freezing, and vacuum freeze drying includes the following steps: transporting a feed liquid into a preheated spray tower, wherein the feed liquid forms liquid droplets after being atomized by an atomizer in the spray tower, dispersing air is introduced into a top of the spray tower, and the dispersing air disperses the atomized liquid droplets; introducing hot air into the top of the spray tower, wherein the liquid droplets are partially formed into dry-like particles after being dried by the hot air, the surface dried particles fall, through a bottom of the spray tower, into a cooling pool arranged under the spray tower, and the particles, after being frozen, are transferred to a freeze drying device for freeze drying.

7 Claims, 1 Drawing Sheet

(56) References Cited

U.S. PATENT DOCUMENTS

| | | | | |
|---|---|---|---|---|
| 7,007,406 | B2* | 3/2006 | Wang | B01D 1/18 |
| | | | | 34/286 |
| 9,920,989 | B2* | 3/2018 | Luy | F26B 5/065 |
| 9,945,611 | B2* | 4/2018 | DeMarco | F26B 5/065 |
| 10,864,457 | B2* | 12/2020 | Madsen | B05B 17/00 |
| 2008/0075777 | A1* | 3/2008 | Kennedy | B01D 9/005 |
| | | | | 424/484 |
| 2008/0155853 | A1* | 7/2008 | Wang | F26B 5/065 |
| | | | | 34/286 |
| 2014/0230266 | A1* | 8/2014 | Luy | F26B 5/065 |
| | | | | 34/92 |
| 2015/0175716 | A1* | 6/2015 | Robinson | F26B 5/065 |
| | | | | 536/112 |
| 2015/0226478 | A1* | 8/2015 | DeMarco | F26B 5/065 |
| | | | | 34/92 |
| 2017/0259185 | A1* | 9/2017 | Madsen | B05B 17/00 |

FOREIGN PATENT DOCUMENTS

| | | |
|---|---|---|
| CN | 206700793 U | 12/2017 |
| CN | 110523096 A | 12/2019 |
| CN | 111704739 A | 9/2020 |
| CN | 212467156 U | 2/2021 |
| CN | 112754048 A | 5/2021 |
| CN | 112914106 A | 6/2021 |
| WO | 2019175954 A1 | 9/2019 |
| WO | 2021170724 A1 | 9/2021 |

* cited by examiner

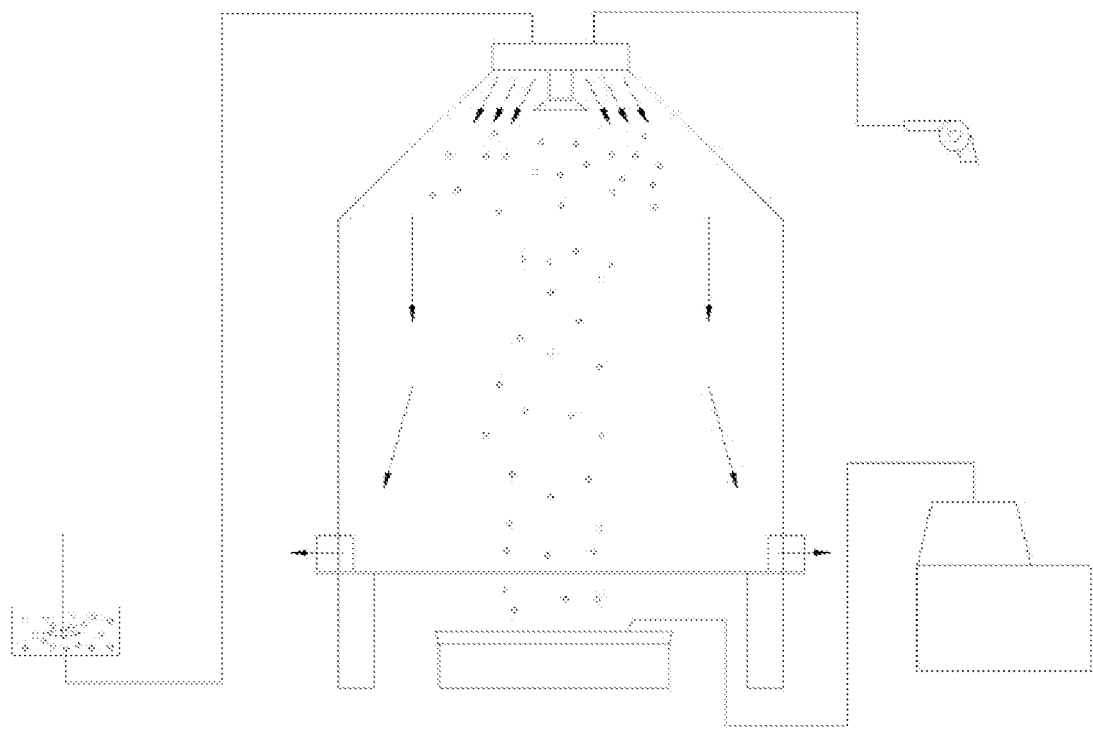

METHOD FOR PREPARING BIOACTIVE PARTICLES BY SPRAY DRYING, LIQUID NITROGEN QUICK-FREEZING AND VACUUM FREEZE DRYING

CROSS REFERENCE TO RELATED APPLICATIONS

This application is the national stage entry of International Application No. PCT/CN2022/072985 filed Jan. 20, 2022, and which is based upon and claims priority to Chinese No. 202111512342.8 filed Dec. 8, 2021, the entire contents of which are incorporated by reference herein.

TECHNICAL FIELD

The present invention relates to drying technologies, and more particularly to a method for preparing granules by spray drying, liquid nitrogen quick-freezing, and vacuum freeze drying, particularly for encapsulated particles of active substances such as probiotics.

BACKGROUND ART

The production methods of living bacterial powder (including probiotics, fecal transplant bacteria) and other products with high activity requirements (such as biological enzyme products, pharmaceutical preparations, and functional foods) mainly include spraying drying, freeze drying, and spray freeze drying. For example, the traditional method of drying probiotics is direct freezing-drying. Although the probiotic cell activity in the obtained powder is high, yet during the powder preparation process, because the material contains a large amount of water, the energy consumption is large, the production capacity is low, the density of the obtained powder is small, and the particle size is difficult to control, which is not conducive to later packaging, transportation and storage.

The spray drying method has greater ability to control granules, which can effectively reduce production costs and break through the bottleneck of large-scale pulverization technology for biological products with high heat sensitivity. However, it is generally considered that during the spray drying process, the liquid droplets lose water quickly due to presence of high-temperature air, and the granules will heat up, causing extensive inactivation of bacterial cells or enzyme molecules. However, spray drying is known to produce a denser shell around each particle to encapsulate the particle.

The technology of the present invention will prepare powder with high physical quality (such as density and fluidity) and high bio-activity or other powders of the particles with by combining the processing methods.

SUMMARY OF THE INVENTION

The technical problem to be solved by the present invention is to overcome the above shortcoming of the prior art by providing a method for preparing bioactive particles by spray drying, liquid nitrogen quick-freezing, and vacuum freeze drying.

To solve the above technical problem, the present invention uses the following technical solutions.

A method for preparing bio-active particles by spraying-drying, liquid nitrogen quick-freezing, and vacuum freezing-drying includes the following steps:

Step 1: preparing a feed liquid;
Step 2: preheating the inside of a spray tower, wherein the feed liquid enters the spray tower from the top of the spray tower through a pump, the feed liquid is atomized by an atomizer in the spray tower to form liquid droplets, dispersing air is introduced co-currently into the top of the spray tower, and the dispersing air disperses the atomized liquid droplets;
Step 3: introducing hot air into the top of the spray tower, wherein a temperature at the top of the spray tower is controlled at 80-120° C., and the liquid droplets are partially formed (surface is sufficiently dry) into dry-like particles;
Step 4: collecting dry-like particles from a bottom of the spray tower and transferring the dry-like particles to a cooling pool, this may be done through a fluidized bed or a vibrated bed transporting the particles to a cooling pool besides the dryer, wherein the solid particles are formed into granules after being completely frozen;
Step 5: quickly transferring the granules formed in Step 4 to a freeze drying device for freeze drying.

In Step 2, hot air is introduced into the top of the spray tower to preheat the inside of the spray tower to 80-120° C.; the pump generates enough pressure to cause the feed liquid to enter the atomizer (such as a pressure atomizer or an ultrasonic atomizer) in the spray tower for atomization; and a ratio of a flow rate of the dispersing air to a flow rate of the feed liquid is larger than approximately 1:7.

In Step 4, liquid nitrogen or dry ice (dry ice may also be used as the quick freezing medium) is kept in the cooling pool.

In Step 5, the freeze drying device is a vacuum freeze dryer (it is possible to use an atmospheric freeze dryer), and particles in the cooling pool are transferred into a container of the freeze dryer manually, mechanically or automatically.

Compared with the prior art, by using the method for preparing particles by spraying-drying, liquid nitrogen quick-freezing and vacuum freeze drying according to the present invention, first, ~90% water content in the liquid droplets is removed by spray drying to realize control of water content of the particles; then the formed particles are quickly frozen by liquid nitrogen (or dry ice) and then freeze dried. Compared with directly freeze drying the feed liquid, the drying time is shortened by ~30%, and the prepared particles are high in density. Compared with a direct spray drying method, the particles prepared according to the present method have a reduced water content of about 5% or lower and have good fluidity, and the survival rate of probiotics encapsulated in the powder is increased to ~60%.

BRIEF DESCRIPTION OF THE DRAWINGS

FIG. 1 is a schematic drawing showing the work principle of the present invention.

DETAILED DESCRIPTION

The technical solutions of the embodiments of the present invention will be described clearly and completely below.

Embodiment 1

A 30 wt % skimmed milk solution was used as a carrier to embed probiotics for experiments. When drying using hot air, the temperature at the top of the tower was controlled at about 85° C.

Step 1: a certain amount of dried skimmed milk powder was dissolved in sterilized ultrapure water to prepare a 30 wt % skimmed milk solution. The solution was stirred by magnetic force for 30 minutes. Freshly cultured probiotics were centrifuged, and the supernatant was removed. The cultured probiotics were mixed with the skimmed milk solution in a certain proportion. The mixture was stirred by magnetic force for 30 minutes. Then, a feed liquid for spray drying was obtained.

Step 2: hot air was introduced into the spray tower at a flow rate of 220 U-min, and the preheating of the tower lasted for 2.7 hours. The temperature at the top of the spray tower rose to 84° C. The feed liquid was transported into the spray tower from the top of the spray tower through a pump. A pressure of the pump was controlled at 0.4 kg/cm$^2$. After being atomized by piezo-electric atomizer in the spray tower, liquid droplets were formed.

Step 3: hot air was introduced into the top of the spray tower to dry the atomized liquid droplets downstream, and most of the liquid droplets formed dry-like particles (i.e. surface is dried) after being dried by the hot air.

Step 4: the dry-like particles fell from a bottom of the spray tower into a cooling pool below the spray tower, the air is allowed to escape to the outside of the dryer. The solid particles are formed.

Step 5: the particles obtained after collecting for a period of time in Step 4 were poured together with a small amount of liquid nitrogen from the cooling pool into a container with a slightly smaller volume, and the container filled with the granules was directly put into a freeze drying device for freeze drying for 12-14 h.

The water content of the powder prepared by the present invention was 8%, and the probiotic cell survival rate was ~38%.

Embodiment 2

A 30 wt % skimmed milk solution was used as a carrier to embed probiotics for experiments. When drying using hot air, the temperature at the top of the tower was controlled at about 95° C.

Step 1: a certain amount of dried skimmed milk powder was dissolved in sterilized ultrapure water to prepare a 30 wt % skimmed milk solution. The solution was stirred by magnetic force for 30 minutes. Freshly cultured probiotics were centrifuged, and the supernatant was removed. The cultured probiotics were mixed with the skimmed milk solution in a certain proportion. The mixture was stirred by magnetic force for 30 minutes. Then, a feed liquid for spray drying was obtained.

Step 2: hot air was introduced into the spray tower at a flow rate of 220 U-min, and the preheating of the tower lasted for 3 hours. The temperature at the top of the spray tower rose to 93° C. The feed liquid was transported into the spray tower from the top of the spray tower through a pump. A pressure of the pump was controlled at 0.4 kg/cm$^2$. After being atomized by piezo-electric atomizer in the spray tower, liquid droplets were formed.

Step 3: hot air was introduced into the top of the spray tower to dry the atomized liquid droplets downstream, and most of the liquid droplets formed dry-like particles (i.e. surface is dried) after being dried by the hot air.

Step 4: the dry-like particles fell from a bottom of the spray tower into a cooling pool below the spray tower, and formed solid particles after being frozen. Dry-like particles may also be transported through a fluidized bed or a vibrated bed to a cooling pool besides the dryer.

Step 5: the particles obtained after collecting for a period of time in Step 4 were poured together with a small amount of liquid nitrogen from the cooling pool into a container with a slightly smaller volume, and the container filled with the particles was directly put into a freeze drying device for freeze drying for 12-14 h.

The water content of the powder prepared by the present invention was 4.5%, and the probiotic cell survival rate was ~67%.

Embodiment 3

A 30 wt % skimmed milk solution was used as a carrier to embed probiotics for experiments. When drying using hot air, the temperature at the top of the tower was controlled at about 115° C.

Step 1: a certain amount of dried skimmed milk powder was dissolved in sterilized ultrapure water to prepare a 30 wt % skimmed milk solution. The solution was stirred by magnetic force for 30 minutes. Freshly cultured probiotics were centrifuged, and the supernatant was removed. The cultured probiotics were mixed with the skimmed milk solution in a certain proportion. The mixture was stirred by magnetic force for 30 minutes. Then, a feed liquid for spray drying was obtained.

Step 2: hot air was introduced into the spray tower at a flow rate of 220 L/min, and the preheating of the tower lasted for 3.3 hours. The temperature at the top of the spray tower rose to 112° C. The feed liquid was transported into the spray tower from the top of the spray tower through a pump. A pressure of the pump was controlled at 0.4 kg/cm$^2$. After being atomized by a piezo-electric atomizer in the spray tower, liquid droplets were formed.

Step 3: hot air was introduced into the top of the spray tower to dry the atomized liquid droplets downstream, and most of the liquid droplets formed dry-like particles (i.e. surface is dry) after being dried by the hot air.

Step 4: the dry-like particles fell from a bottom of the spray tower into a cooling pool below the spray tower, and formed solid particles after being frozen. Dry-like particles may also be transported through a fluidized bed or a vibrated bed to a cooling pool besides the dryer.

Step 5: the particles obtained after collecting for a period of time in Step 4 were poured together with a small amount of liquid nitrogen from the cooling pool into a container with a slightly smaller volume, and the container filled with the particles was directly put into a freeze drying device for freeze drying for 12-14 h.

The water content of the powder prepared by the present invention was ~5%, and the probiotic cell survival rate was ~50%.

Comparative Example 1

A 30 wt % dried skimmed milk solution was used as a carrier to embed probiotics for experiments. The heater inside the spray tower was turned off. The temperature at the inlet at the top of the spray tower was about 25° C. The air flow rate was controlled at 220 L/min. When the atomized liquid droplets directly fell into the cooling pool below the bottom of the tower without being heated, the collected frozen and freeze dried powder had an activity of less than −5%, and the particles had a low density.

Comparative Example 2

A 30 wt % skimmed milk solution was used as a carrier to embed probiotics for experiments. The temperature at the inlet at the top of the spray tower was about 150° C. Dry particles were directly collected at the bottom of the tower. The survival rate of the probiotic powder after being spraying-dried was 2%.

It can be seen that when the atomized liquid droplets form solid shell-like semi-dry particles after contraction and then fall into liquid nitrogen, the survival rate of the probiotic powder after being frozen and dried is remarkably increased; the freeze drying time is shortened, the particles have a larger density, lower water content and good fluidity, facilitating subsequent packaging, storage and use.

What is claimed is:

1. A method for preparing dried bio-active particles by spraying-drying, liquid nitrogen quick-freezing, and vacuum freeze drying, characterized by comprising the following steps:
    Step 1: preparing a feed liquid;
    Step 2: preheating the inside of a spray tower, wherein the feed liquid enters the spray tower from the top of the spray tower through a pump, the feed liquid is atomized by an atomizer in the spray tower to form liquid droplets, dispersing air is introduced into the top of the spray tower, and the dispersing air disperses the atomized liquid droplets;
    Step 3: introducing hot air into the top of the spray tower, wherein a temperature at the top of the spray tower is controlled at 80-120° C., and the liquid droplets are turned into dry-like particles after being dried by the hot air, wherein wherein 85-95% of the water content in the liquid droplets is removed by spray drying;
    Step 4: collecting the dry-like particles from a bottom of the spray tower and transferring the dry-like particles to a cooling pool for quick freezing;
    Step 5: without intermediate storage and while maintaining the frozen state transferring the frozen particles formed in Step 4 to a freeze drying device for freeze drying.

2. The method for preparing dried bio-active particles by spray drying, liquid nitrogen quick-freezing, and vacuum freeze drying according to claim 1, characterized in that: the feed liquid in Step 1 is formed by stirring living bacteria dried bioactive particles, an encapsulating wall material and water.

3. The method for preparing dried bio-active particles by spray drying, liquid nitrogen quick-freezing, and vacuum freeze drying according to claim 1, characterized in that: in Step 2, hot air is introduced into the top of the spray tower to preheat the inside of the spray tower.

4. The method for preparing dried bio-active particles by spray drying, liquid nitrogen quick-freezing, and vacuum freeze drying according to claim 1, characterized in that: in Step 2, the feed liquid enters the spray tower for atomization under a pressure of the pump.

5. The method for preparing dried bio-active particles by spray drying, liquid nitrogen quick-freezing, and vacuum freeze drying according to claim 1, characterized in that: in Step 2, a magnitude of the dispersing air depends on a flow rate of the feed liquid, and a ratio of a flow rate of the dispersing air to the flow rate of the feed liquid is about 7:1.

6. The method for preparing dried bio-active particles by spray drying, liquid nitrogen quick-freezing, and vacuum freeze drying according to claim 1, characterized in that: in Step 4, liquid nitrogen (or dry ice) is kept in the cooling pool.

7. The method for preparing dried bio-active particles by spray drying, liquid nitrogen quick-freezing, and vacuum freeze drying according to claim 1, characterized in that: in Step 5, the freeze drying device is a vacuum freeze dryer (an atmospheric dryer may be used), and particles in the cooling pool are transferred into a container of the freeze dryer manually, mechanically or automatically.

* * * * *